United States Patent
Guerin et al.

(10) Patent No.: US 7,120,120 B2
(45) Date of Patent: Oct. 10, 2006

(54) METHOD AND SYSTEM FOR TOPOLOGY CONSTRUCTION AND PATH IDENTIFICATION IN A TWO-LEVEL ROUTING DOMAIN OPERATED ACCORDING TO A SIMPLE LINK STATE ROUTING PROTOCOL

(75) Inventors: Roch Guerin, Newtown Square, PA (US); Rajendran Rajan, Philadelphia, PA (US)

(73) Assignee: Ipsum Networks, Inc., Bala Cynwyd, PA (US)

( * ) Notice: Subject to any disclaimer, the term of this patent is extended or adjusted under 35 U.S.C. 154(b) by 969 days.

(21) Appl. No.: 10/077,251

(22) Filed: Feb. 15, 2002

(65) Prior Publication Data
US 2003/0072270 A1    Apr. 17, 2003

Related U.S. Application Data

(63) Continuation-in-part of application No. 09/997,420, filed on Nov. 29, 2001, now Pat. No. 6,836,465.

(51) Int. Cl.
H04L 12/26 (2006.01)
H04L 12/28 (2006.01)
G06F 15/173 (2006.01)

(52) U.S. Cl. ............ 370/238; 370/235; 370/252; 370/254; 370/401; 709/238; 709/241

(58) Field of Classification Search ........... 370/235, 370/238, 229, 238.1, 254, 351, 389, 401, 370/252; 709/241, 238
See application file for complete search history.

(56) References Cited

U.S. PATENT DOCUMENTS 4,939,726 A     7/1990  Flammer
5,101,348 A     3/1992  Arrowood et al.
5,115,433 A     5/1992  Baran
5,309,433 A     5/1994  Cidon
5,317,566 A     5/1994  Joshi
5,323,394 A     6/1994  Perlman
5,365,523 A    11/1994  Derby et al.
5,398,012 A     3/1995  Derby et al.
5,497,368 A *   3/1996  Reijnierse et al. ......... 370/351
5,687,168 A    11/1997  Iwata
5,754,790 A *   5/1998  France et al. ............... 709/238
5,831,975 A *  11/1998  Chen et al. ................. 370/256
5,930,259 A     7/1999  Katsube
6,003,090 A    12/1999  Puranik et al.
6,023,501 A     2/2000  Wakamatsu
6,078,590 A *   6/2000  Farinacci et al. .......... 370/432
6,097,718 A     8/2000  Bion (Continued)

OTHER PUBLICATIONS

U.S. Appl. No. 09/977,420, Guerin.

(Continued)

*Primary Examiner*—Ricky Q. Ngo
*Assistant Examiner*—Venkatesh Haliyur
(74) *Attorney, Agent, or Firm*—Pepper Hamilton LLP

(57) ABSTRACT

A method and system for extracting and building end-to-end route information in a two-level, multi-area Internet protocol (IP) autonomous system (AS) operated according to a simple link state routing protocol such as the Integrated System to Integrated System (IS-IS) protocol is disclosed. The method and system enables a user, such as a network administrator, to explicitly identify a full set of paths (links and routers) that a given IP packet would potentially traverse from its entry point in the area of the AS where it originates until its exit point in its intended destination or exit area.

9 Claims, 8 Drawing Sheets

U.S. PATENT DOCUMENTS

| | | | |
|---|---|---|---|
| 6,108,710 | A | 8/2000 | Brabson |
| 6,119,170 | A | 9/2000 | Schoffelman |
| 6,205,146 | B1 | 3/2001 | Rochberger |
| 6,222,829 | B1 | 4/2001 | Nakazaki |
| 2002/0024934 | A1* | 2/2002 | Galand et al. .............. 370/238 |
| 2002/0064132 | A1* | 5/2002 | Akyol et al. ................ 370/250 |
| 2003/0179742 | A1* | 9/2003 | Ogier et al. ................ 370/351 |

OTHER PUBLICATIONS

J.D. Case, et al., "Simple Network Management Protocol", Internet Engineering Task Force, Request for Comments No. 1157, http://www.ietf.org/rfc/rfc1157.txt, May 1990.

Cisco Systems, "NetFlow FlowCollector 3.0 Documentation", http://www.cisco.com/warp/public/732/Tech/netflow/.

Juniper Networks, "Juniper Networks cflowd documentation", http://arachne3.juniper.net/products/network_mgmt_refs.html.

J. Moy, "OSPF Version 2", Internet Engineering Task Force, Request for Comments No. 2328, http://www.ietf.org/rfc/rfc2328.txt, Apr. 1998.

D. Oran, "OSI IS-IS Intra-Domain Routing Protocol", Internet Engineering Task Force, Request for Information No. 1142, http://www.ietf.org/rfc/rfc1142.txt, Feb. 1990.

* cited by examiner

FIG. 7 Representative Computer
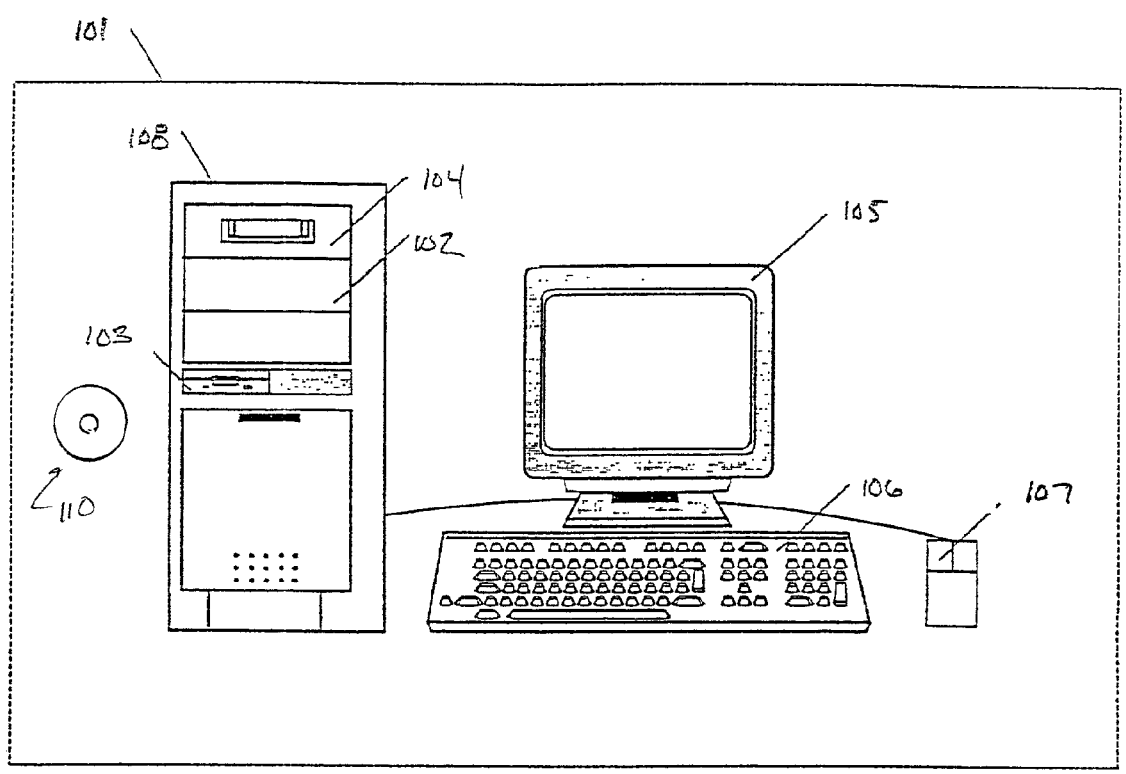

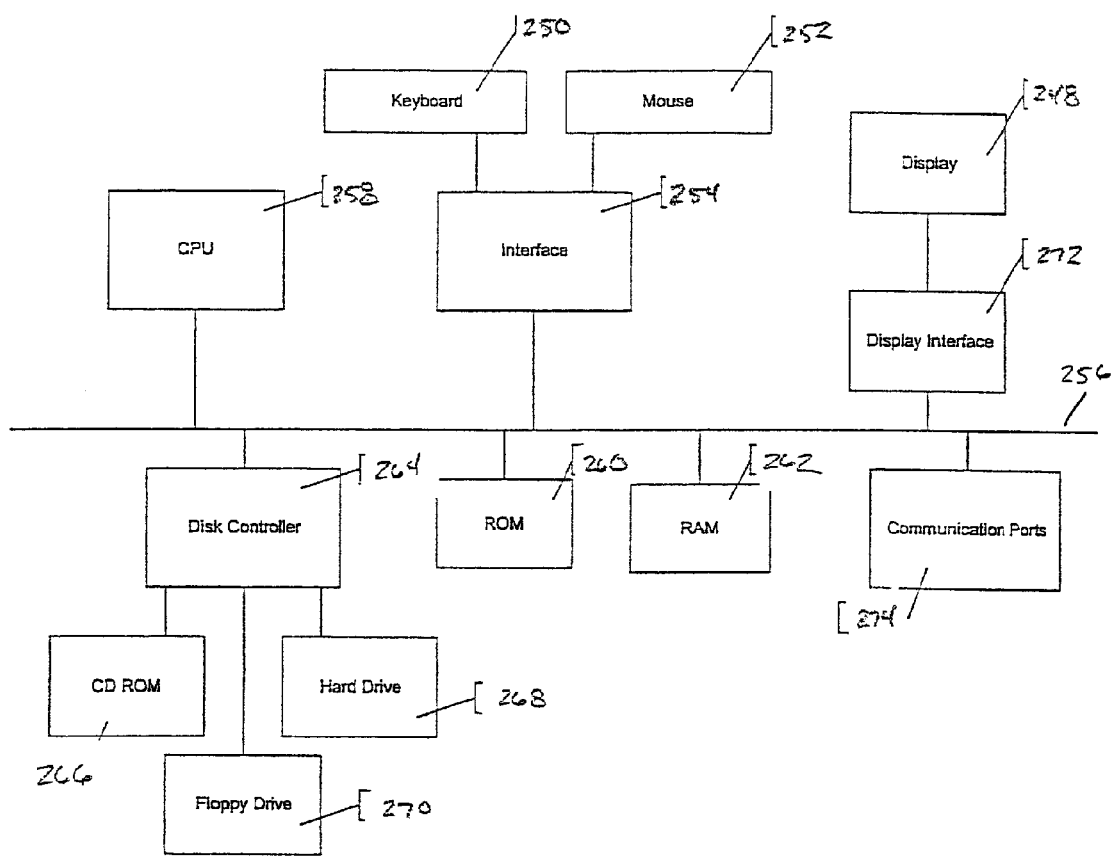
FIG 8  Computer System Internal Diagram

METHOD AND SYSTEM FOR TOPOLOGY CONSTRUCTION AND PATH IDENTIFICATION IN A TWO-LEVEL ROUTING DOMAIN OPERATED ACCORDING TO A SIMPLE LINK STATE ROUTING PROTOCOL

RELATED APPLICATIONS

This application claims priority to, and is a continuation-in-part application of, U.S. patent application Ser. No. 09/997,420, filed Nov. 29, 2001, now U.S. Pat. No. 6,836,465, which is incorporated herein by reference in its entirety.

FIELD OF THE INVENTION

The present invention relates generally to a method and system for acquiring information from an Internet Protocol (IP) two-level, multi-area routing domain operating according to a simple link state routing protocol such as the Intermediate System to Intermediate System (IS-IS) routing protocol. More particularly, the present invention relates to a method and system for determining the set of links and routers that are traversed by traffic to and/or from an individual user in a communications network where routing is determined according to a simple link state routing protocol, such as the IS-IS protocol.

BACKGROUND OF THE INVENTION

An Internet protocol (IP) network is a large distributed system in which individual routers automatically adjust their decisions on how to forward packets based on information they learn from their neighbors about the state of the network. This design permits rapid recovery in case of link or router failures by allowing affected routers to re-route packets around the failure as soon as they discover it. The Intermediate System to Intermediate System (IS-IS) routing protocol is a commonly used embodiment of this design.

However, the distributed mode of operation of routing protocols such as IS-IS makes it difficult for a network administrator to have a global view of the network at any given time. Because of this, many of the network management functions that are available for networks based on more traditional technologies, e.g., connection-oriented such frame relay or asynchronous transfer mode (ATM), are difficult if not impossible to replicate in IP networks. For example, in a connection-oriented network, the state associated with each connection/user provides the network administrator with a ready handle for tracing its path and monitoring the resources it relies on. In contrast, in IP networks, because routing decisions are made in a distributed fashion by many routers that are only concerned with local packet forwarding decisions, there is no single entity with complete knowledge of the entire path that a packet will follow at any given time. This makes it difficult for a network administrator to precisely identify the path that the traffic between, for example, two customer sites, is following when traversing the network.

As a consequence, upon identifying a highly congested link, a network administrator has no or only limited visibility into which customers may be experiencing poor performance as a result of this congestion. Similarly, in the presence of a link failure, identifying which customers are immediately affected as well as predicting which ones may also experience a change in service performance shortly after the failure is again a very complex task in IP networks.

Management tools do exist for IP networks, but they are typically reactive or operate at a coarse granularity, i.e., not at the level of the end-to-end performance of an individual customer or site. For example, routers typically support standard Management Information Bases (MIBs) that can be queried using protocols such as the Simple Network Management Protocol (SNMP). MIBs provide detailed state information about individual routers, e.g., interface status, number of packets or bytes transmitted and received on each interface, etc. However, this information is local to each device, and does not offer a network wide perspective. Furthermore, piecing together MIB information from multiple routers to derive end-to-end performance measures of relevance to a given customer is not an easy task. A similar limitation exists when relying on traffic monitoring information that is routinely gathered at routers using mechanisms such as Cisco's NetFlow™ or Juniper cflowd™. These monitoring devices capture detailed information about the traffic crossing a given interface, but again do not have the ability to identify end-to-end paths. Converting such traffic monitoring data into end-to-end intelligence is a laborious task.

A few tools exist that are capable of end-to-end sampling of paths traversing an IP network. Most of them are based on two core utilities built into the Internet Protocol, ping and traceroute, which allow a network administrator to probe the network in order to generate estimates of end-to-end performance measures such as packet loss and delay, and record full path information. However, solutions based on utilities such as ping and traceroute often are not desirable because they are neither scalable nor capable of providing real-time information about the network behavior as a user experiences it.

Accordingly, it is desirable to provide an improved method and system for monitoring, tracking, and/or predicting the distributed routing state of an IP network, and in particular IP networks where the routing state is determined based on a link state routing protocol such as the IS-IS protocol.

The following is provided as additional background information about the Internet and Internet routing protocols to help the reader understand the context of the present invention:

The Internet is a global network that consists of multiple interconnected smaller networks or Autonomous Systems (AS) also called routing domains. The delivery of packets across this Interconnection of Networks is carried out under the responsibility of the IP suite. In particular, routing protocols such as IS-IS disseminate the state of the network (which links/routers are up or down) to enable network nodes to determine how best to forward packets towards their destination.

Internet routing protocols can be divided into intra-domain and inter-domain protocols, with inter-domain protocols communicating information between ASs, while intra-domain protocols are responsible for determining the forwarding of packets within each AS. The IS-IS protocol is an example of an intra-domain protocol. This general architecture and the associated suite of protocols are rapidly becoming the de facto technology on which modern communication networks are built. This dominance extends from simple local area networks to large-scale, international carrier networks, and is largely due to the robustness and efficiency of networks built using it. In particular, IP networks are often referred to as "connectionless", and the delivery of data packets to their intended destination is performed through a number of "independent" decisions made by the routers to which a packet is being forwarded.

SUMMARY OF THE INVENTION

It is therefore a feature and advantage of the present invention to provide an improved method and system for monitoring, tracking, and/or predicting the routing path of one or more packets crossing a two-level, multi-area routing domain operated according to a simple link state routing protocol such as the IS-IS protocol.

In accordance with one embodiment of the present invention, a method for constructing topology and routing information in a two level multi-area routing domain that includes a plurality of level one areas and a level two area and which is operated according to a simple link state routing protocol, includes the steps of (i) acquiring topology and routing information, including route entries, for each area in the routing domain; (ii) within each level one area, identifying possible level one exit points into the level two area; (iii) for each level one exit point through which a route entry known in the level one area can be reached, determining a cost of reaching the route entry from the level one exit point; (iv) for each route entry known in the level two area, identifying at least one level two exit point out of the level two area; (v) for each level two exit point through which a route entry can be reached, determining a cost of reaching the route entry from the level two exit point; and (vi) for all exit points out of the level two area, determining the set of level one areas, if any, to which they connect.

In accordance with an alternate embodiment, a method for constructing end-to-end paths between a specified origin and a specified destination in a two-level multi-area routing domain operated according to a simple link state routing protocol includes the steps of: (i) acquiring topology and routing information for each area in the routing domain; (ii) identifying an origin area and an entry point in the origin area; (iii) determining whether the origin area is a level one area or level two area; (iv) retrieving a route entry in the origin area, where the route entry is associated with a specified destination; (v) extracting a set of exit points from the origin area through which the route entry associated with the specified destination can be reached; and (vi) computing shortest paths in the origin area between the entry point and each exit point in the set of exit points.

In this embodiment, if the origin area is a level one area and the route entry retrieved in the routing step is not a null or default entry, the method may also include the steps of: (i) for each exit point associated with the route entry, computing a cost of reaching the route entry through that exit point by adding a cost of the shortest path between the entry point and the exit point to a cost of reaching the route entry from the level one exit point; and (ii) identifying at least one minimum total cost path to the specified destination through one of the exit points.

Alternatively, if the origin area is a level one area and the route entry retrieved in the retrieving step is a null or default entry, the method may also include the step selecting at least one exit point into the level two area, wherein at least one of the selected exit points corresponds to a minimum cost shortest path. Here, if at least one of the selected exit points serves as an origin point into the level two area for extension of the shortest path to the specified destination, and the level two area may be considered as an origin area for said extension of the shortest path.

Optionally, if the origin area is a level one area, the exit points returned in the extracting step may be a function of whether a route entry associated with the specified destination address is present in a route table that is associated with the level one area.

If the origin area is a level two area, the exit points returned in the extracting step may be routers that advertised reachability for a route entry associated with the specified destination in a route table that is associated with the level two area. Alternatively, if the origin area is a level one area, the exit points returned in the extracting step may be are routers that advertised reachability for a route entry associated with the specified destination in a route table that is associated with the level one area.

If the origin area is a level one area, the exit points returned in the extracting step may be routers that are connected to the level two area. Also, the retrieving step may include accessing a route table maintained for the level one area and failing to retrieve from the route table a non-null or non-default route entry associated with the specified destination. Alternatively, If the origin area is a level two area, the retrieving step may include accessing a route table for the level two area and retrieving a route entry associated with the specified destination.

Also, if the origin area is a level two area, the method may also include the steps of: (i) for each exit point obtained in the extracting step, computing a total cost by adding the cost of the corresponding shortest path to the cost of reaching the route entry from the exit point; (ii) eliminating exit points and shortest paths that do not correspond to minimum total costs from the set of exit points; (iii) identifying shortest paths associated with exit points through which the route entry is directly reachable; (iv) eliminating, from the set of exit points, those exit points through which the route entry is directly reachable; (v) for each exit point remaining in the set of exit points, identifying a possible subsequent level one area into which the paths need to be extended; and (vi)

extending paths from each remaining exit point into the subsequent level one area. Here, the last extending step may include selecting an origin area exit point and an associated next level one area, specifying a level one entry point in the next level one area based on the origin area exit point, retrieving a next level route entry in the next level one area associated with the specified destination, identifying a set of level one exit points from the next level one area through which the next level route entry can be reached and determining a cost of reaching the route entry from each of those exit points, computing shortest paths in said level one area between the level one entry point and the level one exit points and for each level one exit point computing a total cost by adding the cost of the corresponding shortest path to the cost of reaching the level one route entry from the level one area exit point, eliminating level one exit points and shortest paths that do not correspond to minimum total costs; and identifying shortest paths associated with level one exit points that correspond to minimum total cost paths.

In accordance with an alternate embodiment of the invention, a computer-readable medium contains instructions thereon for instructing a computing device to perform any of all of the steps described above.

There have thus been outlined the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 7 illustrates an exemplary computing device and carrier.

FIG. 8 illustrates a block diagram of the internal hardware of the computer of FIG. 7.

DETAILED DESCRIPTION OF PREFERRED EMBODIMENTS OF THE INVENTION

A preferred embodiment of the present invention provides an improved method and system for monitoring, tracking, and/or predicting the routing path of one or more packets under a simple IP routing protocol such as the IS-IS protocol.

The present invention allows a network administrator, network monitoring system, or other human or automated user to identify the path or paths followed or expected to be followed by any packet traveling though a two-level, multi-area routing domain or AS, where the packet has a known entry point or address and a known or anticipated destination address. The destination address is associated with a routing entry, typically from a routing table, and the present invention constructs the path that was or is expected to be followed through the routing domain by the packet associated with the routing entry. Optionally and preferably, when more than one path is possible, the invention is capable of constructing the complete set of possible paths, any of which the packet may follow.

Figure 1:
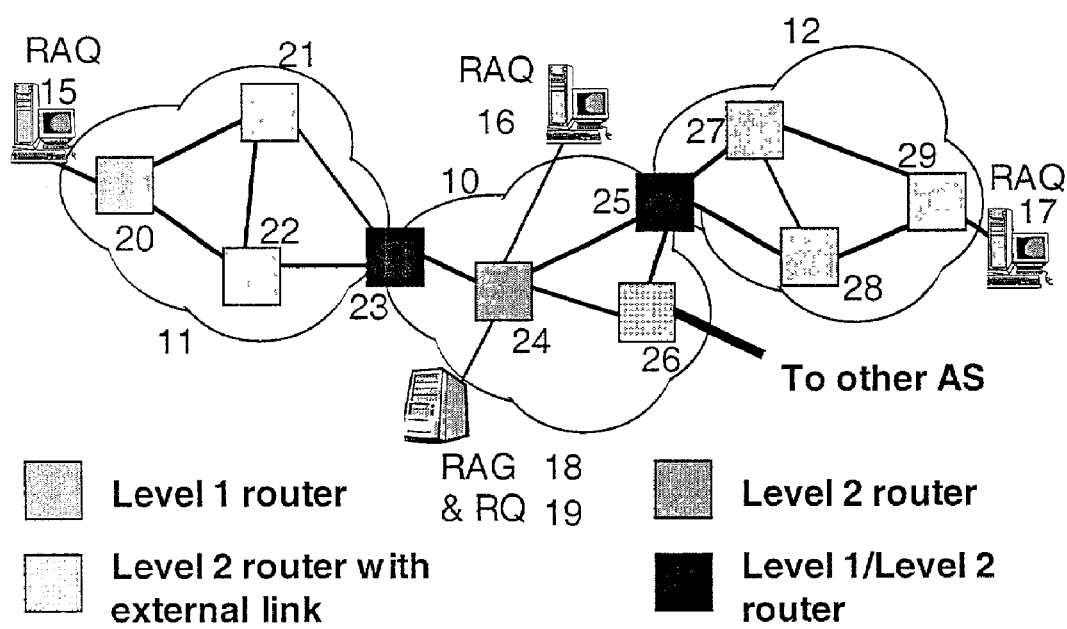
FIG. 1 illustrates an exemplary AS, or routing domain, where the present invention may be applied, including various elements of the AS such as areas, different types of routers, route acquisition modules, a route aggregation module, an a route query module.

FIG. 1 illustrates an exemplary two-level, multi-area AS, or routing domain, where the present invention may be applied. The domain illustrated in FIG. 1 is not, of course, the only domain configuration in which the invention may apply, but it is only intended to serve as an illustration of one possible domain. Referring to FIG. 1, the illustrated AS includes three areas 10, 11, and 12. The present invention may also be used with an AS having more than three or fewer than three areas. Routing in the AS is performed according to the IS-IS routing protocol described in RFC 1142 and RFC 1195, which will be used for illustrative purposes in the context of this preferred embodiment. Area 10 corresponds to the "level 2" area that in IS-IS is used to connect other (level 1) areas in the AS. All traffic originating in a given level 1 area and destined to a destination located in or reachable from another (level 1 or level 2) area is routed trough the level 2 area. In other words, the IS-IS protocol assumes a "spoke and hub" configuration, where the level 2 area is the hub through which flows all traffic between other level 1 areas (spokes). Within an area packets are routed along shortest paths, where shortest paths are computed according to configured level 1 link weights (metrics). Each level 1 area and the level 2 area typically includes a plurality of routers 20 to 29 that direct and transport packet traffic so as to provide connectivity within and between areas. In addition, level 2 routers can also have links connected to other routing domains, and as a result provide connectivity to destinations in other ASs as well. Accordingly, in an IS-IS AS, routers can be classified into: (1) level 1 routers 20, 22, 27, 28, 29 that route information to and from other routers that are associated with a single area; (2) level 1/level 2 routers 23, 25 which participate in routing a level 1 area as well as in the level 2 area 10; and (3) level 2 routers 24 and 26 that are only involved in routing in the level 2 area 10. In addition, level 1/level 2 routers as well as level 2 routers can serve as exit and/or entry points to and from the AS, e.g., router 26.

In accordance with the present invention, the AS includes one or more Route AcQuisition (RAQ) modules 15, 16, and 17. Typically, there is one RAQ module for each area of the AS, although it is possible that an area may have no RAQ module or more than one RAQ module. The RAQ modules, which preferably have the features of a routing device, essentially serve as route listeners and participate in the routing protocol of their respective area. This allows them to receive much or all of the routing information exchanged between routers in their area. In the context of IS-IS, this information takes on different forms depending on whether it pertains to level 1 or level 2 routers.

Within both level 1 and level 2 areas, the information is advertised by routers through link state protocol data units (LSPs), which allow all routers in an area to build a complete "map" of their area, together with the location of destinations (routes) local to the area and the location of exit points capable of reaching remote destinations, i.e., destinations located in other areas or in another AS altogether. Specifically, this map identifies all the routers belonging to the level 1 or level 2 area together with their local route entries, and the "cost" associated with each one of their links. The availability of such a map enables routers in an area to compute shortest or least cost paths to any route entry located in the area. This is preferably accomplished through the use of the Dijkstra shortest path algorithm that is run on the graph constructed from the area map available at each router. For example, referring to area 11 in FIG. 1, if the costs of links between all pairs of routers are taken equal to one, then the least cost path for a packet to travel from RAQ module 15 to router 21 would be via router 20 and would have a cost of two, since it takes two "hops" to reach the destination: a first hop to router 20 and a second hop to router 21. Alternatively, if the cost of the link between router 20 and router 21 was, for example, three, then the total cost for the packet to travel from RAQ module 15 to router 21 through router 20 would be one plus three, which is four, and therefore not the least cost path to reach router 21. The least cost path is now through routers 20 and 22 for a total cost of three to reach router 21.

Providing the same level of detailed topology and cost information for routes entries located in other areas or in a different AS is often not practical for scalability reasons. As a result, the IS-IS protocol relies on a different routing paradigm when it comes to destinations in other areas or in another AS. Specifically, level 1 routers that also participate in level 2 routing, e.g., routers 23 and 25 in FIG. 1, advertise in their level 1 area that they are capable of reaching destinations outside of the level 1 area. Level 1 routers then forward packets destined for a destination outside of their level 1 area towards the closest level 2 router. Once a packet headed for a destination outside the level 1 area reaches the nearest level 2 router, its forwarding is handled by level 2 routing.

Routing information is distributed in the level 2 area in a similar manner as it is distributed in a level 1 area, with the one difference being that level 2 routers advertise not only route entries that are directly attached to them, but also route entries they have learned from participating in level 1 routing. For each such route, the level 2 router advertises a cost equal to the sum of the cost advertised by the level 1 router that originated the LSP containing the route entry, and the cost of the level 1 path from the level 2 router to the level 1 router in question. The level 2 router has access to both pieces of information because of its participation in level 1 routing. For example, in reference to FIG. 2, because it participates in the level 1 routing of area 70, (level1/level 2) router 53 would receive the level 1 LSP originated by level 1 router 54 and advertise reachability to route 158.124.69.0/24 with a cost of two (2). Furthermore, router 53 would also learn that router 54 is its (level 1) neighbor, so that it could compute a (level 1) cost of four (4) for reaching route 158.124.69.0/24 in area 70. Router 53 would, therefore, originate a level 2 LSP in area 71, containing route entry 158.124.69.0/24 with an associated cost of four (4). Similarly, router 57 would originate a level 2 LSP in area 71, also containing route entry 158.124.69.0/24 but with an associated cost of five (5). This information would in turn enable other level 2 routers in area 71 to choose a shortest path for reaching a destination associated with route entry 158.124.69.0/24. For example, router 61 would choose to forward to router 57 any packets destined for route entry 158.124.69.0/24, e.g., packets addressed to destination 30 with address 158.124.69.15. This is because the total cost of reaching route entry 158.124.69.0/24 from router 61 is equal to six (6=5+1) through router 57 and eight (8=4+2+2) through router 53. In contrast, router 60 will be equally likely to forward packets to either router 53 or router 57, as both yield a total path cost of nine (9).

To summarize, routing in an IS-IS routing domain operating according to the specifications of RFC 1142 and RFC 1195 proceeds along shortest paths within an area, and relies on the progressive extension of shortest paths from area to area for destinations located in a different area or routing domain. This is best illustrated through simple examples in the context of FIG. 2, which will also be used to explain how the RAG module processes information in receives from the RAQ modules in each area and uses it to respond to path query requests initiated by the route query module.

Consider the case of a packet destined for host 158.124.69.15 in area 70 and originated by host 134.34.21.142 in area 72. The packet is transmitted on network 42 and received by router 64, which is a level 1 router in area 72. Router 64 determines that the packet is not destined for a destination located in area 72, i.e., it is not associated with any know local route entry. As a result, the packet is forwarded towards the closest "attached" level 2 router, i.e., the closest router that has advertised that it can reach destinations in other areas. In the case of router 64, the closest level 2 router is router 61, so that the packet is forwarded to router 65 that is on the shortest path from router 64 to router 61. Router 65 essentially follows the same process as router 64, so that the packet is eventually delivered to router 61. Contrary to level 1 routers in area 72, router 61, because it participates in level 2 routing in area 71, has a (level 2) route entry (158.124.69.0/24 ) that matches the destination address 158.124.69.15. Router 61 learned of this route entry from level 2 LSPs originated into area 71 by routers 53 and 57, which both participate in the level 1 routing of area 70 where the route entry is located. As discussed earlier, router 61 forwards the packet destined to 158.124.69.15 directly to router 57, as it identified this option as being the shortest path for reaching route entry 158.124.69.0/24.

From the above discussion, it should be clear that a RAQ module located in a given area and participating in the routing protocol of that area, is capable of acquiring all the routing information known in the area. However, any such RAQ module is unable to provide a global AS-level view of how routing is done, i.e., of constructing paths extending across multiple areas as in the case of the previous example. This is because the information available at a RAQ module is limited to that of the area to which it belongs. Piecing together information acquired from RAQ modules in different areas task is the responsibility of the Route AggreGation (RAG) module 18 of FIG. 1. One RAG module is typical, but more than one RAG module is a possible option for ensuring redundancy.

The RAG module 18 is in substantially constant communication with many, and preferably all, of the RAQ modules in the different areas of its AS. The RAG module receives from the RAQ modules the routing information that the RAQ modules have acquired through participating in the routing protocol of their individual level 1 or level 2 area. Specifically, each RAQ module forwards to the RAG module copies of all the LSPs that they receive. Because it is possible for a RAQ module to receive multiple copies of the same LSP, the RAQ module preferably does not automatically forward to the RAG module any advertisement it receives. Instead, the RAQ module first checks to determine if the LSP is a new one, and only then will it forward it to the RAG module. This avoids unnecessarily burdening the RAG module with duplicate advertisements. In addition to changes caused by the receipt of an update from one of the RAQ module's neighboring routers, there are other events that can affect the routing and topology information maintained by the RAQ module. In particular, most link state routing protocols, including IS-IS, rely on various timer based "liveness" mechanisms to detect failures and remove out-of-date information from the topology database. The expiration of one such timer triggers the removal of a corresponding piece of information from the topology database maintained by routers. Such a change also needs to be reported to the RAG module to ensure that its information is consistent with that maintained by the RAQ module. In other words, the RAQ module acting as a router maintains an up-to-date view of routing and topology information in its own area, and is responsible for ensuring that this information is conveyed to the RAG module in a timely and reliable manner. The RAG module parses and processes this information to construct a complete image of how routing is carried out across the AS, and support the extraction of end-to-end (across the AS, including multiple areas) paths. This processing is described in more details below. The RAG module may be any computing device, such as a PC, laptop, server, or individual workstation having a processor and memory.

The AS also includes at least one Route Query (RQ) module 19 that is shown in FIG. 1 as co-located with the RAG module 18. Alternatively, the RQ module may be a separate device, such as a computing device having an input/output port or communications port and communicating with the RAG module. The RQ module 19 serves as an interface for a user, such as a network administrator, to retrieve information collected by the RAG module. The RQ module 19 interfaces to the RAG module 18 and coordinates the process of retrieving complete path information from the data structures maintained by the RAG module. The RQ module 19 accepts as inputs an identifier for the starting point within the AS for a path or route that is to be retrieved, and an identifier for the end point or destination for the path. The identifier of the starting point can be a host name or IP address local to the AS, i.e., belonging to one of the subnets in the AS, or be in the form of an interface number belonging to one of the routers in the AS, i.e., identifying the entry point into the AS. The identifier of the desired end-point or destination will typically be in the form of a host name or IP address, and need not be associated with a device that is local to the AS. In the case of a remote end-point, the path information that is returned extends from the (local) entry point in the AS to the exit point from the AS towards the next AS that is to be used in order to reach the remote destination.

We now describe how the RAG module processes the information it receives from RAQ modules and uses it to identify paths between specified origin and destination. The approach followed by the RAG module is iterative in nature. It starts from within the area where the origin of the path(s) to be computed is located, and proceeds area by area, if needed, to discover the full path. The number of iterations needed depend on the location of the intended destination relative to the specified starting or entry point. Specifically, when referring to FIG. 2 and considering host 30 as the origin of the path query, the RAG module can return a set of paths extending across a single (level 1 or level 2) area (level 1 area 70 for destination 31), or multiple areas (e.g., a level 1 area followed by the level two area, or vice versa).

Figure 5:
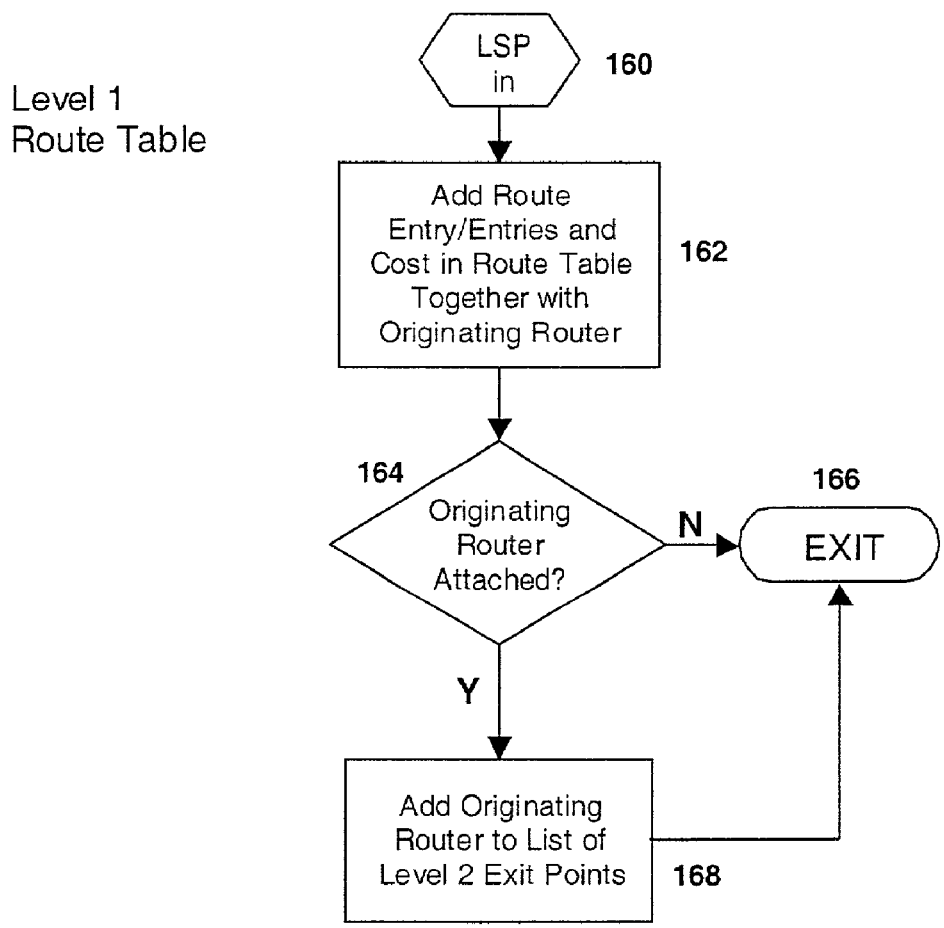
FIG. 5 illustrates exemplary steps performed by a route aggregation module when constructing the route table of a level one area in a two-level, multi-area routing domain.
Figure 6:
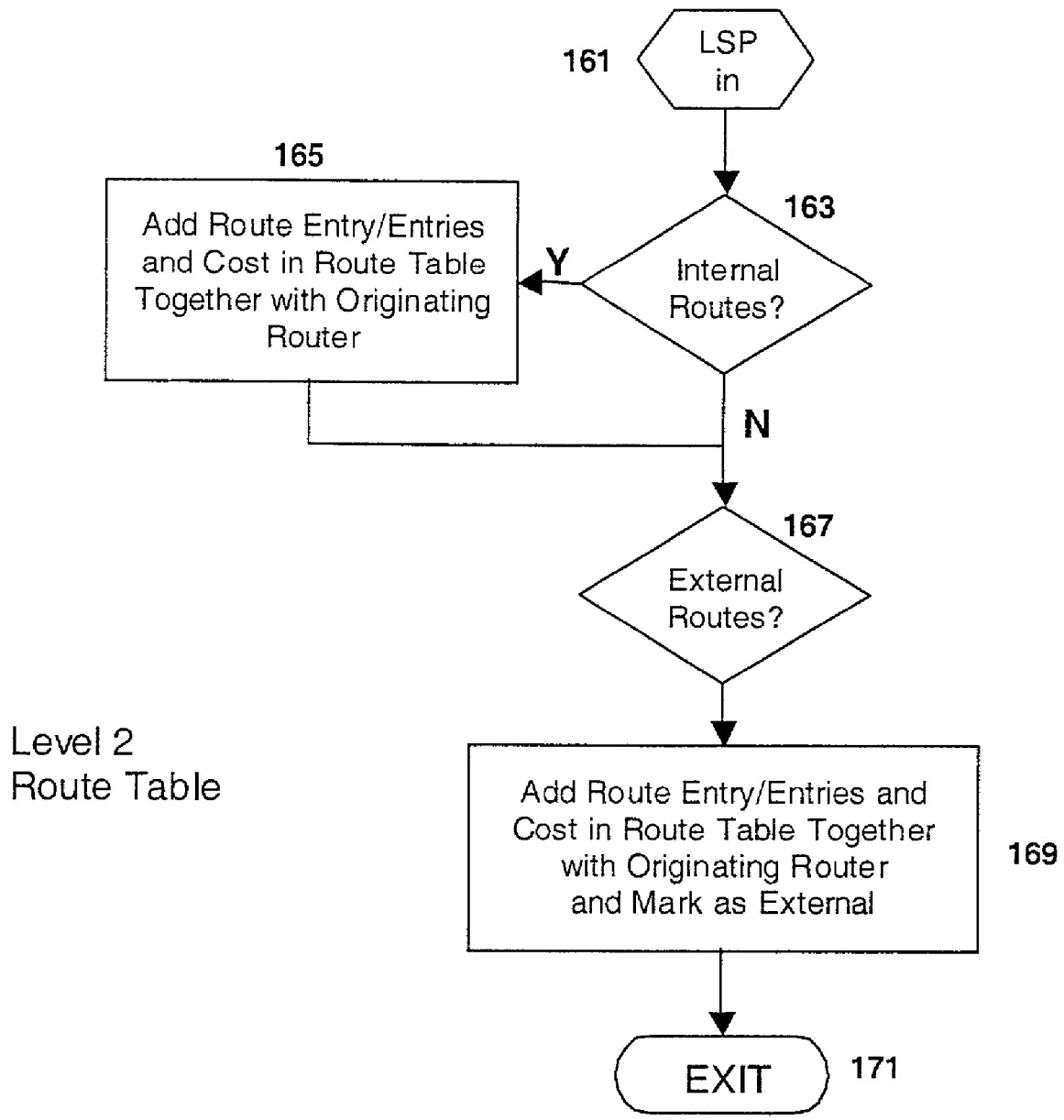
FIG. 6 illustrates exemplary steps performed by a route aggregation module when constructing the route table of a level two area in a two-level, multi-area routing domain.

The RAG module has at its disposal all the information available from the RAQ modules situated in the different areas of the AS, i.e., all the LSPs they have received in their respective area. The steps used by the RAG module to organize the information it receives from the LSPs forwarded by the RAQ modules in its AS are illustrated in FIG. 5 and FIG. 6, which describe the Route Tables that the RAG module builds for level 1 and level 2 areas, respectively. Those steps will be detailed and illustrated in the context of several path query examples. As mentioned earlier, within an area the RAG module computes shortest paths to all local destinations, i.e., destinations for which a route entry exists in the area, based on the LSPs it has received from the RAQ module in that area. For destinations that are not associated with a route entry in the level 1 area of the origin of a path query, the RAG module identifies possible exit points from the level 1 area, and associated path(s) through the level 1 area, based on the closest level 2 routers, i.e., the closest level 1 routers in the area that advertised they were attached to the level 2 area. The RAG module then proceeds to extend into the level 2 area the paths from the exit points out of the level 1 area. This extension is based on first retrieving the route entry associated with the destination address in the level 2 area and identifying the level 2 routers that advertised reachability to it. Once those routers have been identified, the RAG module computes shortest paths from all the exit points of the level 1 area (now entry points into the level 2 area) and the level 2 routers that have advertised reachability to the route entry associated with the destination address (now the exit points from the level 2 area). For each such shortest path, the RAG module computes a total cost for the complete path to the route entry associated with the destination address, by combining the cost of the shortest path to the exit point from the level 2 area with the cost advertised by that exit point for reaching the route entry. For each entry point into the level 2 area, the RAG module only keeps paths to exit points from the level 2 area that have minimum total costs. Note that this can result in the elimination of exit points that do not correspond to minimum total cost paths for any of the entry points into the level 2 area. Finally, for all the exit points out of the level 2 area that remain, the RAG module extends, if necessary, the paths from those exit points towards the route entry associated with the destination address.

The nature of this last extension depends on whether or not the destination address is directly reachable from the level 2 exit points. Specifically, in case the route entry associated with the destination address is either directly attached to the level 2 exit point or located in another routing domain that is reachable through the level 2 exit point, the path extension step terminates immediately. However, if the route entry associated with the destination address is attached to a level 1 router in another level 1 area in which the level 2 exit point router also participates as a level 1 router, then the path extension step consists of computing level 1 shortest paths from the level 2 exit point to the level 1 router that advertised area reachability to the route entry associated with the destination address. This last step typically involves only one level 1 area and completes the identification of the path(s) followed through the routing domain between the specified origin and destination address.

An alternative approach to computing shortest paths to exit points and then determining a total cost of reaching, through each exit point, the route entry associated with the destination address, is to directly compute this total cost simply by extending the shortest path computation to include "nodes" corresponding to the route entry. Those nodes are attached to each exit point through an edge with a cost equal to the cost of reaching the route entry from the exit point. For example, in the case of route entries that are directly reachable from an exit point (router), the edge would correspond to the local link or network with a cost set to the cost advertised by the exit point (router) for that local link or network. In the case of routes in another area or AS, the edge would be a logical edge with again a cost corresponding to the cost of reaching the route as advertised by the exit point (router).

Figure 2:
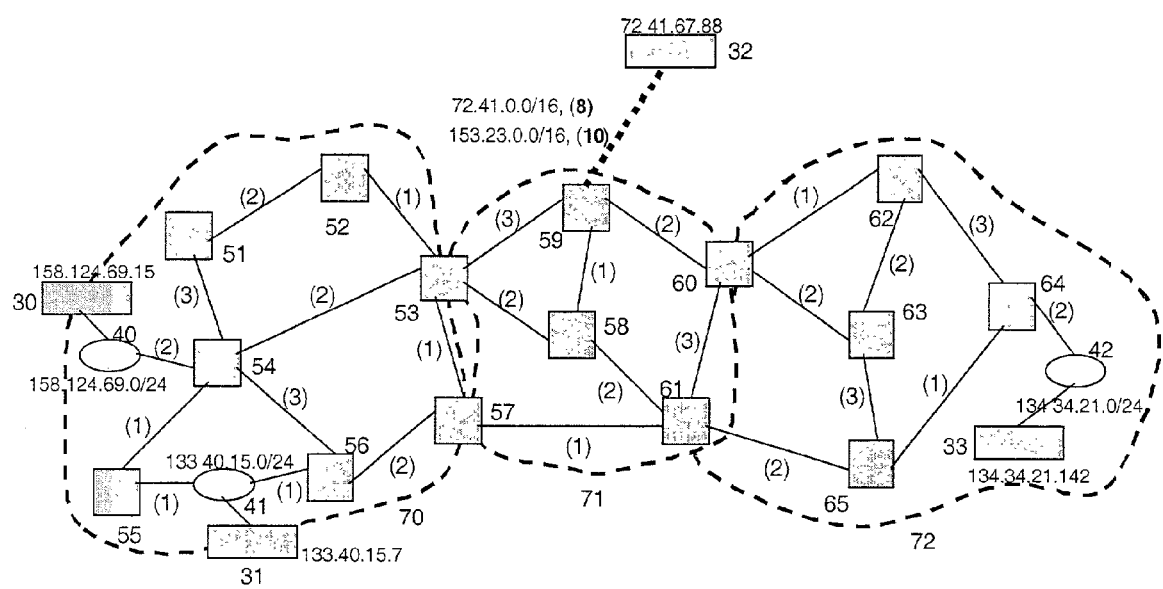
FIG. 2 illustrates different combinations origin and destinations that may be used when performing a path query in accordance with the present invention.

Three representative configurations are considered in FIG. 2, which help illustrate further how the RAG module processes information it receives from the RAQ modules to construct topology and routing information for the entire AS, and the steps it follows when using it to construct a path.

The steps followed in each one of those three cases are described next in reference to FIG. 3, FIG. 4, FIG. 5, and FIG. 6.

Figure 3:
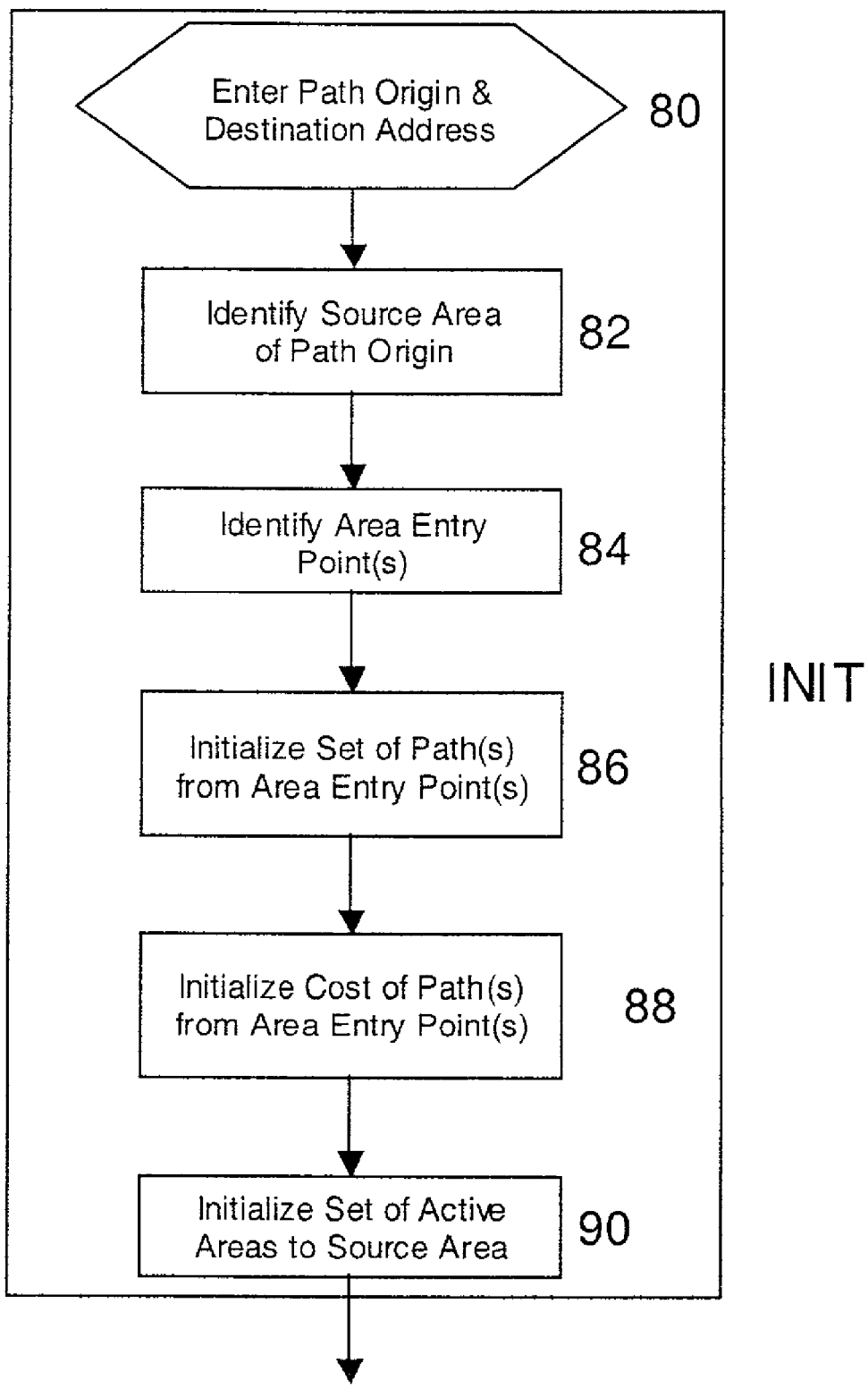
FIG. 3 illustrates exemplary initialization steps that may be performed by a route query module when initiating a new route query in accordance with the present invention.

FIG. 3 describes a number of initialization steps (INIT) that are taken in all cases at the start of a path query. The first step 80 consists of specifying the starting point or origin for the path together with the intended destination address. Step 82 identifies the source area for the query, i.e., the area where the path origin is located. In reference to origin 30 of FIG. 2, Step 82 would return area 70. The identification by the RAG module of the source area of a query can be readily performed using the Route Table that the RAG module maintains for each area based on the information it receives from the RAQ modules. Specifically, upon receiving the identification of the path origin, e.g., in the form of the IP address of an interface or a local host, the RAG module proceeds to first query the Route Table of its different level 1 areas to identify if one of them contains a route entry associated with the origin address. If none of them does, then the origin of the path query is by elimination located in the level 2 area. The process followed by the RAG module for building the Route Table of each area is best illustrated in reference to FIG. 5 and FIG. 6 that describe the construction of the Route Table that the RAG module maintains for level 1 areas and the level 2 area, respectively.

The Route Table of an area is constructed and possibly updated based on LSPs received from the RAQ module(s) associated with the area. In the case of a level 1 area shown in FIG. 5, upon receipt of an LSP (Step 160), the RAG module proceeds to extract the route entries it carries and add them, if not already present, to the Route Table, or uses them to modify existing entries (Step 162). The Route Table stores the route entries themselves together with the associated cost and the identity of the router that originated the LSP. Note that the IS-IS protocol specifies multiple metrics, such as minimum or maximum delay, bandwidth, and/or monitoring cost so that a route entry can include one cost figure for each metric. For the sake of simplicity, we will limit our discussions to a single metric, although multiple metrics can be handled in a similar fashion. The next step, decision box 164, determines if the originating router advertised that it was attached to the level 2 area. If it did, the router is added to the list of level 2 exit points for the level 1 area (Step 168).

The case of a level 2 area shown in FIG. 6 is essentially similar. Upon receipt of a level 2 LSP, the RAG module proceeds to check for the first type of routes it can contain, namely internal routes or routes associated with addresses belonging to the AS (decision box 163). If the LSP carried such routes, they are added, if not already present, or used to modify the Route Table, and again both the cost and the originating router are also stored in the route entry (Step 165). Note that in the case of level 2 routers, internal routes include both routes that are directly reachable from the level 2 router itself, and routes that it has learned from participating in the routing protocol of one of the level 1 areas to which it is attached. The RAG module next checks for the presence of external routes (decision box 167), or routes to destinations reachable through other ASs, and processes them in a similar fashion as internal routes, except for the fact that they are marked as external (step 169).

Returning to FIG. 3, the next initialization step, Step 84, identifies the entry point(s) into the source area that is (are) associated with the path origin. In the context of origin 30 in FIG. 2, the entry point in area 70 is router 54. This identification is again readily performed using information from the Route Table, which for each route entry includes the set of routers associated with the route entry. Note that because multiple routers can advertise a given route entry, it is possible to have multiple entry points.

Continuing with the initialization procedure of FIG. 3, Step 86 initializes the path(s) associated with the area entry point(s) and Step 88 determines the associated cost(s). The path(s) is(are) typically initialized to the path segment(s) connecting the path origin to the area entry point(s) of Step 84. For the example of source 30 in FIG. 3, the entry point into area 70 is router 54, so that the initial path segment is of the form 30-40-54,where network 40 identifies the manner in which source 30 is attached to router 54. This information is again readily available from the Route Table maintained by the RAG module for area 70. The cost(s) of the path segment is typically set to zero (0), as it is for the example of source 30 in FIG. 2. The last initialization step, Step 90, initializes the set of active areas to contain the source area or area 70 for the example of FIG. 2.

Figure 4:
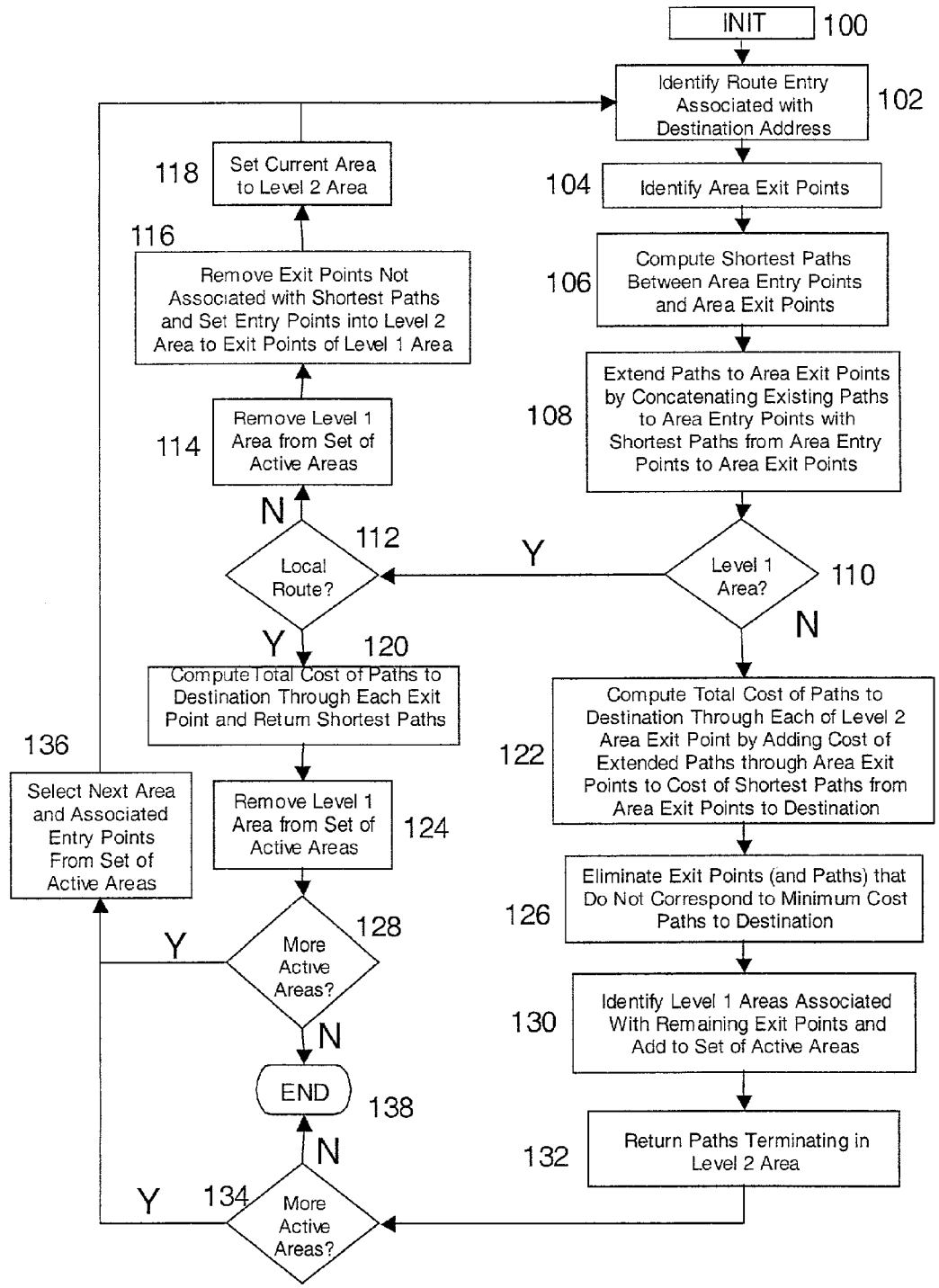
FIG. 4 illustrates an exemplary sequence of steps performed by a route query module in order to return a set of paths types in response to a route query in accordance with the present invention.

FIG. 4 describes the overall sequence of steps followed by a path query once the initialization steps of FIG. 3 (INIT step 100 in FIG. 4) have been completed. As mentioned earlier, some of those steps can be repeated several times based on the location of the destination address and the number of areas involved in the paths used to reach it.

Consider, for example, the case illustrated in FIG. 2, where exemplary destination 31 that belongs to level 1 area 70, which is also the origin area where exemplary source 30 is located. Step 102 of FIG. 4 comprises identifying the route entry in area 70 (from FIG. 2) that is associated with the destination address 133.40.15.7 of destination 31. From FIG. 2 we see that this address is associated with subnet 133.40.15.0/24, which is therefore the route entry returned by step 102. The RAG module readily performs this step by searching the Route Table of area 70 that it constructed following the steps of FIG. 5 based on the information it receives from the RAQ module serving area 70.

Once this is known, returning to FIG. 4, the route query proceeds to step 104 that is responsible for identifying the set of exit points in area 70 through which destination 31, can be reached. In the case of destination 31, that is local to area 70, two local routers, 55 and 56, advertised a route entry for the network node 41 (130.40.15.0/24) with which the destination address 130.40.15.7 is associated, so that they are returned as the exit points through which destination 31 can be reached. Step 106 then computes shortest paths from the entry point in area 70, router 54, to those two routers.

Continuing the example, step 106 returns one shortest path to each exit point. The shortest path to router 55 has cost one (1), while the shortest path to router 56 has cost three (3). Note that the cost labels associated with each link in FIG. 2 correspond to the cost of the corresponding outgoing link, which is why the cost of two (2) shown on the link between network node 40 and router 54 is not counted. Those two shortest paths are used in Step 108 to extend the initial path "30-40-54" into two paths. The two extended paths are "30-40-54-55" and "30-40-54-56". Decision box 110 checks next if the current area is a level 1 area, and since area 70 is a level 1 area, the "Y" branch is followed to decision box 112, which checks if the route is local to the level 1 area. For level 1 areas, this information is readily available from their Route Table, since the only route entries explicitly present in the table are local to the area. In the case of destination 31 that is local to the current level 1 area 70, the "Y" branch is followed to Step 120. Step 120 first computes for each path the total cost of reaching destination 31. This simply consists of adding the cost to the (local) route entry advertised by each exit point, namely one (1) for routers 55 and 56, to the cost of the shortest path to the exit point, namely a cost of one (1) for router 55 and a cost of and three (3) for router 56. The resulting total costs are two (2) and four (4) for routers 55 and 56, respectively. As a result, the path through router 56 is recognized as not being a shortest path and only the path through router 55 is returned at the end of Step 120. The next step is Step 124 that simply removes area 70 from the set of active areas before entering decision box 128 that checks if there are more active areas. In the example of destination 31, the answer is no, so that the "N" branch out of decision box 128 is followed into termination box 138.

The example of destination 32 that is external to the level 1 area where source 30 is located is considered next, as it will illustrate some of the steps involved in identifying paths that extend outside a single area. The initialization steps for FIG. 3 are essentially similar to those of destination 31, but some differences appear in the first few steps of FIG. 4. Specifically, in Step 102 the process of retrieving a route entry associated with destination address 72.41.67.88 returns empty, null, or default, as no (local) route entry exists for this address in level 1 area 70. As a result, the process of identifying exit points from area 70 is also different, in that the set of exit points that is returned consists of the set of level 2 exit points for level 1 area 70. In the case of level 1 area 70, this set consists of routers 53 and 57 (see FIG. 5 for how this set is constructed). Steps 106 and 108 are as before, with shortest paths computed between router 54 and routers 53 and 57, and concatenated with the initial path segment between source 30 and router 54. Next, the "Y" branch of decision box 110 is followed to decision box 112, but the latter is exited through its "N" branch since there is no local route entry for destination 32 in area 70. Step 114 simply removes area 70 from the set of active areas, and Step 116 drops exit point 57 from the set of possible exit points from area 70, and selects router 53 as the only entry point into the level 2 area 71. Exit point 57 was dropped since it did not correspond to the closest possible entry point into the level 2 area from router 54. Step 118 sets the level 2 area 71 as the current area and proceeds to reenter Step 102, which this time will return a route entry for destination address 72.41.67.88 since router 59 advertised (external) reachability to route entry 72.41.0.0/16. Step 104 actually identifies only router 59 as a possible exit point from area 71, so that Step 106 computes shortest paths only between router 53 and router 59. Step 106 returns two shortest paths of cost three (3), one consisting of the direct link between the two routers and a second transiting through router 58. Step 108 concatenates the path segment in level 1 area 70 with the two shortest paths returned by Step 106, and proceeds to decision box 110. Decision box 110 is exited through its "N" branch as the current area is the level 2 area 71, and Step 122 is entered. Step 122 computes a total cost of thirteen (13=2+ 3+8) for the shortest path from source 30 to destination 32, when exiting through router 59 in area 71, where we have assumed that the external cost of eight (8) advertised by router 59 was in the form of an internal metric, i.e., consistent with the metric used within the AS. Note that it should be obvious that this procedure can be readily extended to handle the case of external metrics. Step 126 does not result in the elimination of any exit point or path, since there is only one exit point and all paths have the same cost. Step 130 proceeds to identify if there are additional level 1 areas that need to be explored in order to reach destination 32. Because the only route entry (there could be more than one, e.g., an internal route and an external route) associated in area 71 with the destination address (72.41.67.88) of destination 32 is an external route (see FIG. 6 for how this information is acquired), Step 130 determines that no further level 1 areas need to be explored from router 59, and the set of paths associated with it are returned in Step 132. Finally, because the set of (level 1) active areas is now empty, decision box 134 is exited through its "N" branch and termination box 138 is entered.

The last of example of destination 33 illustrates a path that extend out of the level 2 area and into another level 1 area. Because of its similarities with the previous two examples, only the steps involving the level 2 area 71 and how to exit from it are described.

Route 134.34.21.0/16 is the route entry that corresponds to the address (134.34.21.142) of destination 33 in the level 2 area 71, and it is identified as having two exit points from area 71, routers 60 and 61, that advertise a cost of six (6) and five (5), respectively, for reaching the destination. This information is available from the Route table of area 71 based on the steps of FIG. 6. As was the case with destination 32, the entry point into area 71 is router 53, so that Step 106 computes shortest paths between router 53 and routers 60 and 61. Step 106 returns two shortest paths of cost five (5) for router 60, and one shortest path of cost four (4) for router 61. Those paths are then extended in Step 108 from which decision box 110 is entered, and exited through its "N" branch. Step 122 computes a total cost of eleven (11=6+5) for paths through router 60, and a total cost of nine (9=5+4) for paths through router 61. As a result, router 60 and its associated paths are eliminated from further consideration in Step 126, and only router 61 is kept and searched in Step 130 for possible level 1 areas through which to extend the path. The search of Step 130 proceeds in two steps. First the set of level 1 areas in which router 61 participates is retrieved, and second the Route Table of each area is searched for a route entry associated with the destination address. In the case of destination address 134.34.21.142 and router 61, the Route Table of area 72 is searched and route entry 134.34.21.0/24 is returned.

Note that the list of areas in which a router participates is easily constructed simply by updating that list each time an LSP originated by the router is received in a given area. This information is available at the RAG module based on the updates it receives from the individual RAQ modules in each area. Note also that in case none of the level 1 areas in which the router participates returns a route entry associated with the destination address, then the route is local to the router and possibly advertised only in the level 2 area.

As mentioned earlier in the context of the example of destination 32, a similar situation also exists in the case of external route entries. Conversely, if more than one level 1 area includes a route entry associated with the destination address, only areas corresponding to the most specific entry, in the longest prefix match sense, are kept. Coming back to the example of destination 33, area 72 is identified in Step 130 as the only level 1 area in which router 61 participates, and the search of its Route Table returns route 134.34.21.0/ 24, so that area 72 is the only level 1 area added to the set of active areas. Step 132 does not return any path since the only exit point, router 61, needs to have its path extended in area 72. Because area 72 was added to the set of active area, decision box 134 is exited through its "Y" branch and area 72 is selected in Step 136 as the next area with router 61 as its entry point. Step 102 is then entered and a process essentially identical to that of destination 31 is followed from that point on until termination box 138 is ultimately reached.

Certain portions of the invention may be performed by an automated processing system. Viewed externally in FIG. 7, an exemplary computer system designated by reference numeral 101 has a central processing unit located within a housing 108 and disk drives 103 and 104. Disk drives 103 and 104 are merely symbolic of a number of disk drives which might be accommodated by the computer system. Typically these would include a hard disk drive and optionally one or more floppy disk drives such as 103 and/or one or more CD-ROMs, CD-Rs, CD-RWs or digital video disk (DVD) devices indicated by slot 104. The number and types of drives typically varies with different computer configurations. Disk drives 103 and 104 are in fact options, and they may be omitted from the computer system used in connection with the processes described herein. An exemplary storage medium 110, which is one type of carrier that may contain program instructions and/or data, is also illustrated. Additionally, the computer system utilized for implementing the present invention may be a stand-alone computer having communications capability, a computer connected to a network or able to communicate via a network, a handheld computing device, or any other form of computing device capable of carrying out equivalent operations.

The computer also has or is connected to or delivers signals to a display 105 upon which graphical, video and/or alphanumeric information is displayed. The display may be any device capable of presenting visual images, such as a television screen, a computer monitor, a projection device, a handheld or other microelectronic device having video display capabilities, or even a device such as a headset or helmet worn by the user to present visual images to the user's eyes. The computer may also have or be connected to other means of obtaining signals to be processed. Such means of obtaining these signals may include any device capable of receiving images and image streams, such as video input and graphics cards, digital signal processing units, appropriately configured network connections, or any other microelectronic device having such input capabilities.

An optional keyboard 106 and a directing device 107 such as a remote control, mouse, joystick, touch pad, track ball, steering wheel, remote control or any other type of pointing or directing device may be provided as input devices to interface with the central processing unit.

FIG. 8 illustrates a block diagram of the internal hardware of the computer of FIG. 7. A bus 256 serves as the main information highway interconnecting the other components of the computer. CPU 258 is the central processing unit of the system, performing calculations and logic operations required to execute a program. Read only memory (ROM) 260 and random access memory (RAM) 262 constitute the main memory of the computer.

A disk controller 264 interfaces one or more disk drives to the system bus 256. These disk drives may be external or internal floppy disk drives such as 270, external or internal CD-ROM, CD-R, CD-RW or DVD drives such as 266, or external or internal hard drives 268 or other many devices. As indicated previously, these various disk drives and disk controllers are optional devices.

Program instructions may be stored in the ROM 260 and/or the RAM 262. Optionally, program instructions may be stored on a computer readable carrier such as a floppy disk or a digital disk or other recording medium, flash memory, a communications signal, and/or a carrier wave.

A display interface 272 permits information from the bus 256 to be displayed on the display 248 in audio, graphic or alphanumeric format. Communication with external devices may optionally occur using various communication ports such as 274.

In addition to the standard components of the computer, the computer also includes an interface 254 which allows for data input through the keyboard 250 or other input device and/or the directional or pointing device 252 such as a remote control, pointer, mouse or joystick.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

What is claimed is:

1. A method for constructing end-to-end paths between a specified origin and a specified destination in a two-level multi-area routing domain operated according to a simple link state routing protocol, comprising the steps of:

acquiring topology and routing information for each area in the routing domain;

identifying an origin area and an entry point in the origin area, wherein the origin area is a level one area;

retrieving a route entry in the origin area, the route entry being associated with a specified destination;

extracting a set of exit points from the origin area through which the route entry associated with the specified destination can be reached;

for each exit point associated with the route entry, determining a shortest path in the origin area between the entry point and the exit point;

determining whether the route entry is a null or default entry;

if the route entry is not a null or default entry, for each exit point associated with the route entry, calculating a cost of reaching the route entry through the exit point by adding a cost of the shortest path between the entry point and the exit point to a cost of reaching the route entry from the exit point;

if the route entry is a null or default entry:

selecting at least one exit point into a level two area, wherein each selected exit point corresponds to a shortest path having a minimum cost, and calculating a cost of reaching the route entry through each selected exit point by adding a cost of the shortest path to a cost of reaching the route entry from the exit point; and identifying at least one total path to the specified destination through an exit point, wherein each total path comprises a concatenation of a plurality of hops between the entry point and the specified destination.

2. The method of claim 1 wherein the exit points returned in the extracting step are a function of whether a route entry associated with the specified destination address is present in a route table that is associated with the level one area.

3. The method of claim 1 wherein the exit points returned in the extracting step are routers that advertised reachability for a route entry associated with the specified destination in a route table that is associated with the level one area.

4. The method of claim 1 wherein the exit points returned in the extracting step are routers that are connected to the level two area.

5. A computer-readable medium containing instructions thereon for instructing a computing device to perform the steps of:
  acquiring topology and routing information for each area in a multi-area routing domain that is operated according to a link state routing protocol;
  identifying an origin area in the routing domain and an entry point in the origin area, wherein the origin area is a level one area;
  retrieving a route entry in the origin area, the route entry being associated with a specified destination;
  extracting a set of exit points from the origin area through which the route entry associated with the specified destination can be reached;
  for each exit point associated with the route entry, determining a shortest path in the origin area between the entry point and the exit point;
  determining whether the route entry is a null or default entry;
  if the route entry is not a null or default entry, for each exit point associated with the route entry, calculating a cost of reaching the route entry through the exit point by adding a cost of the shortest path between the entry point and the exit point to a cost of reaching the route entry from the exit point;
  if the route entry is a null or default entry:
    selecting at least one exit point into a level two area, wherein each selected exit point corresponds to a shortest path having a minimum cost, and
    calculating a cost of reaching the route entry through each selected exit point by adding a cost of the shortest path to a cost of reaching the route entry from the exit point; and
  identifying at least one total path to the specified destination through an exit point, wherein each total path comprises a concatenation of a plurality of hops between the entry point and the specified destination.

6. The method of claim 1 wherein identifying at least one total path to the specified destination through an exit point comprises:
  retrieving a level two route entry in the level two area, the level two route entry being associated with a specified destination;
  extracting a set of level two exit points from the level two area through which the level two route entry associated with the specified destination can be reached;
  for each level two exit point associated with the level two route entry:
    determining at least one shortest path in the level two area between the exit point and the level two exit point, and
    calculating a total cost by adding a cost of a corresponding shortest path to a cost of reaching the level two route entry from the level two exit point;
  eliminating level two exit points and shortest paths that do not correspond to a minimum cost from the set of level two exit points;
  for each level two exit point through which the level two route entry is directly reachable, identifying a shortest path associated with the level two exit point, wherein the shortest path comprises a concatenation of a plurality of hops between the entry point and the specified destination;
  eliminating, from the set of level two exit points, each level two exit point through which the route entry is directly reachable;
  for each level two exit point remaining in the set of level two exit points:
    identifying a level one area associated with the level two exit point,
    retrieving a level one route entry in the level one area associated with the specified destination, and
    determining at least one shortest path in the level one area between the level two exit point and the level one route entry; and
  identifying at least one total path to the specified destination, wherein each total path comprises a concatenation of a shortest path in the origin area, a shortest path in the level two area, and a shortest path in the level one area.

7. The computer-readable medium of claim 5 wherein identifying at least one total path to the specified destination through an exit point comprises:
  retrieving a level two route entry in the level two area, the level two route entry being associated with a specified destination;
  extracting a set of level two exit points from the level two area through which the level two route entry associated with the specified destination can be reached;
  for each level two exit point associated with the level two route entry:
    determining at least one shortest path in the level two area between the exit point and the level two exit point, and
    calculating a total cost by adding a cost of a corresponding shortest path to a cost of reaching the level two route entry from the level two exit point;
  eliminating level two exit points and shortest paths that do not correspond to a minimum cost from the set of level two exit points;
  for each level two exit point through which the level two route entry is directly reachable, identifying a shortest path associated with the level two exit point, wherein the shortest path comprises a concatenation of a plurality of hops between the entry point and the specified destination;
  eliminating, from the set of level two exit points, each level two exit point through which the route entry is directly reachable;
  for each level two exit point remaining in the set of level two exit points:
    identifying a level one area associated with the level two exit point,
    retrieving a level one route entry in the level one area associated with the specified destination, and
    determining at least one shortest path in the level one area between the level two exit point and the level one route entry; and
  identifying at least one total path to the specified destination, wherein each total path comprises a concatenation of a shortest path in the origin area, a shortest path in the level two area, and a shortest path in the level one area.

8. A method for constructing end-to-end paths between a specified origin and a specified destination in a two-level multi-area routing domain operated according to a simple link state routing protocol, comprising the steps of:
  acquiring topology and routing information for each area in the routing domain;
  identifying an origin area and an entry point in the origin area, wherein the origin area is a level two area;
  retrieving a route entry in the origin area, the route entry being associated with a specified destination;

extracting a set of exit points from the origin area through which the route entry associated with the specified destination can be reached;

for each exit point associated with the route entry:
- determining at least one shortest path in the origin area between the entry point and the exit point, and
- calculating a total cost by adding a cost of a corresponding shortest path to a cost of reaching the route entry from the exit point;

eliminating exit points and shortest paths that do not correspond to a minimum total cost from the set of exit points;

for each exit point through which the route entry is directly reachable, identifying a shortest path associated with the exit point, wherein the shortest path comprises a concatenation of a plurality of hops between the entry point and the specified destination;

eliminating, from the set of exit points, each exit point through which the route entry is directly reachable;

for each exit point remaining in the set of exit points:
- identifying a level one area associated with the exit point,
- retrieving a level one route entry in the level one area associated with the specified destination, and
- determining at least one shortest path in the level one area between the exit point and the level one route entry; and identifying at least one minimum total cost path to the specified destination, wherein each minimum total cost path comprises a concatenation of a shortest path in the origin area and a shortest path in the level one area.

9. A computer-readable medium containing instructions thereon for instructing a computing device to perform the steps of:

acquiring topology and routing information for each area in a multi-area routing domain that is operated according to a link state routing protocol;

identifying an origin area in the routine domain and an entry point in the origin area, wherein the origin area is a level two area;

retrieving a route entry in the origin area, the route entry being associated with a specified destination;

extracting a set of exit points from the origin area through which the route entry associated with the specified destination can be reached;

for each exit point associated with the route entry:
- determining at least one shortest path in the origin area between the entry point and the exit point, and
- calculating a total cost by adding a cost of a corresponding shortest path to a cost of reaching the route entry from the exit point;

eliminating exit points and shortest paths that do not correspond to a minimum total cost from the set of exit points;

for each exit point through which the route entry is directly reachable, identifying a shortest path associated with the exit point, wherein the shortest path comprises a concatenation of a plurality of hops between the entry point and the specified destination;

eliminating, from the set of exit points, each exit point through which the route entry is directly reachable;

for each exit point remaining in the set of exit points:
- identifying a level one area associated with the exit point,
- retrieving a level one route entry in the level one area associated with the specified destination, and
- determining at least one shortest path in the level one area between the exit point and the level one route entry; and identifying at least one minimum total cost path to the specified destination, wherein each minimum total cost path comprises a concatenation of a shortest path in the origin area and a shortest path in the level one area.

* * * * *

UNITED STATES PATENT AND TRADEMARK OFFICE
CERTIFICATE OF CORRECTION

PATENT NO.       : 7,120,120 B2  
APPLICATION NO.  : 10/077251  
DATED            : October 10, 2006  
INVENTOR(S)      : Roch Guerin et al.

Page 1 of 1

It is certified that error appears in the above-identified patent and that said Letters Patent is hereby corrected as shown below:

Title page, Item (73) Assignee: should read:

Iptivia Inc., Philadelphia, PA (US)

Signed and Sealed this

Eighteenth Day of November, 2008

JON W. DUDAS  
*Director of the United States Patent and Trademark Office*